United States Patent
Wang et al.

(10) Patent No.: US 11,985,576 B2
(45) Date of Patent: *May 14, 2024

(54) MULTIPLEXING OF PHYSICAL SIDELINK CONTROL CHANNEL (PSCCH) AND PHYSICAL SIDELINK SHARED CHANNEL (PSSCH)

(71) Applicant: MediaTek Inc., Hsinchu (TW)

(72) Inventors: Chien-Yi Wang, Hsinchu (TW); Ju-Ya Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 6 days.

This patent is subject to a terminal disclaimer.

(21) Appl. No.: 17/859,117

(22) Filed: Jul. 7, 2022

(65) Prior Publication Data

US 2022/0337983 A1 Oct. 20, 2022

Related U.S. Application Data

(63) Continuation of application No. 16/521,515, filed on Jul. 24, 2019, now Pat. No. 11,432,117.

(60) Provisional application No. 62/717,123, filed on Aug. 10, 2018.

(51) Int. Cl.
*H04W 4/40* (2018.01)
*H04W 72/044* (2023.01)

(52) U.S. Cl.
CPC ........... *H04W 4/40* (2018.02); *H04W 72/044* (2013.01)

(58) Field of Classification Search
CPC ..... H04W 4/40; H04W 72/044; H04W 72/02; H04W 88/04; H04W 92/18; H04L 5/0053; H04L 5/0007; H04L 5/0048; H04L 5/0044
See application file for complete search history.

(56) References Cited

U.S. PATENT DOCUMENTS

| | | | |
|---|---|---|---|
| 10,841,054 B2 | 11/2020 | Yasukawa et al. | |
| 2018/0176942 A1* | 6/2018 | Kim | H04W 72/04 |
| 2018/0234220 A1* | 8/2018 | Yasukawa | H04W 72/04 |
| 2019/0029029 A1* | 1/2019 | Ohtsuji | H04W 4/023 |
| 2019/0069200 A1* | 2/2019 | Zhang | H04W 72/20 |
| 2019/0246385 A1* | 8/2019 | Lin | H04L 5/0094 |
| 2021/0076236 A1* | 3/2021 | Kimura | H04W 24/08 |

* cited by examiner

*Primary Examiner* — Ricardo H Castaneyra
(74) *Attorney, Agent, or Firm* — Tong J. Lee (57) ABSTRACT

For sidelink vehicle-to-everything (V2X) transmission, a first user equipment (UE) obtains time-and-frequency resources that are bounded by two subchannel boundaries and two slot boundaries. The first UE transmits encoded control information to a second UE in a Physical Sidelink Control Channel (PSCCH) that occupies a first portion of the time-and-frequency resources starting from a lowest resource block (RB) in a lowest subchannel and from an earliest symbol available for sidelink control and data transmission. The first UE further transmits encoded data to the second UE in a Physical Sidelink Shared Channel (PSSCH) that occupies a second portion of the time-frequency resources. The second portion includes (a) a first set of RBs in the same symbols as the PSCCH and not used by the PSCCH, and (b) a second set of RBs in symbols not used by the PSCCH.

20 Claims, 7 Drawing Sheets

MULTIPLEXING OF PHYSICAL SIDELINK CONTROL CHANNEL (PSCCH) AND PHYSICAL SIDELINK SHARED CHANNEL (PSSCH)

CROSS-REFERENCE TO RELATED APPLICATIONS

This application is a continuation application of U.S. application Ser. No. 16/521,515 filed on Jul. 24, 2019, which claims the benefit of U.S. Provisional Application No. 62/717,123 filed on Aug. 10, 2018. The entirety of both applications is incorporated by reference herein.

TECHNICAL FIELD

Embodiments of the invention relate to wireless communications; more specifically, to wireless communications between two user equipment terminals (UEs).

BACKGROUND

5G New Radio (NR) is a telecommunication standard for mobile broadband communications. 5G NR is promulgated by the 3rd Generation Partnership Project (3GPP) to significantly improve on performance metrics such as latency, reliability, throughput, etc.

Vehicle-to-Everything (V2X) communication has the potential to modernize mobile communications for vehicles and significantly reduce the number of vehicular crashes and fatalities. Furthermore, V2X technologies can improve traffic management and the safety of autonomous vehicles. V2X technologies enable communications between vehicles as well as communications between a vehicle and other communication entities. NR V2X is built atop of 5G NR and is expected to support advanced V2X applications that require much more stringent Quality of Service (QoS) compared to applications supported by LTE-based V2X. For example, some of the NR V2X use-cases require the end-to-end latency to be as low as 3 milliseconds with a reliability of 99.999%.

As such, there exists a need for further improvements in NR technologies in order to meet the demand for mobile broadband access and the stringent QoS requirements.

SUMMARY

In one embodiment, a method is provided for sidelink V2N transmission. A first user equipment (UE) obtains time-and-frequency resources for the sidelink V2X communication. The time-and-frequency resources are bounded by two subchannel boundaries and two slot boundaries. The first UE transmits encoded control information to a second UE in a Physical Sidelink Control Channel (PSCCH) that occupies a first portion of the time-and-frequency resources starting from a lowest resource block (RB) in a lowest subchannel and from an earliest symbol available for sidelink control and data transmission. The number of RBs in the PSCCH is less than the number of RBs in a subchannel, and the number of symbols in the PSCCH is less than the number of symbols in a slot. The first UE further transmits encoded data to the second UE in a Physical Sidelink Shared Channel (PSSCH) that occupies a second portion of the time-frequency resources. The second portion includes (a) a first set of RBs in the same symbols as the PSCCH and not used by the PSCCH, and (b) a second set of RBs in symbols not used by the PSCCH.

In another embodiment, a transmit (Tx) UE is provided to perform sidelink V2X transmission. The Tx UE includes an antenna, a transceiver coupled to the antenna, one or more processors coupled to the transceiver, and memory coupled to the one or more processors. The Tx UE is operative to obtain time-and-frequency resources for the sidelink V2X communication, wherein the time-and-frequency resources are bounded by two subchannel boundaries and two slot boundaries, and transmit to a receive (Rx) UE encoded control information in a PSCCH that occupies a first portion of the time-and-frequency resources starting from a lowest RB in a lowest subchannel and from an earliest symbol available for sidelink control and data transmission. The number of RBs in the PSCCH is less than the number of RBs in a subchannel, and the number of symbols in the PSCCH is less than the number of symbols in a slot. The Tx UE is further operative to transmit to the Rx UE encoded data in a PSSCH that occupies a second portion of the time-frequency resources. The second portion includes (a) a first set of RBs in the same symbols as the PSCCH and not used by the PSCCH, and (b) a second set of RBs in symbols not used by the PSCCH.

In yet another embodiment, an Rx UE is provided to receive sidelink V2X transmission. The Rx UE includes an antenna, a transceiver coupled to the antenna, one or more processors coupled to the transceiver, and memory coupled to the one or more processors. The Rx UE is operative to receive from a Tx UE encoded control information in a PSCCH that occupies a first portion of time-and-frequency resources starting from a lowest RB in a lowest subchannel and from an earliest symbol available for sidelink control and data transmission. The number of RBs in the PSCCH is less than the number of RBs in a subchannel, and the number of symbols in the PSCCH is less than the number of symbols in a slot. The time-and-frequency resources are bounded by two subchannel boundaries and two slot boundaries. The Rx UE is further operative to receive from the Tx UE encoded data in a PSSCH that occupies a second portion of the time-frequency resources. The second portion includes (a) a first set of RBs in the same symbols as the PSCCH and not used by the PSCCH, and (b) a second set of RBs in symbols not used by the PSCCH.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

In a vehicle-to-everything (V2X) ireless communication system, a User Equipment (UE) may communicate directly with another UE via a sidelink channel, without using a base station as an intermediary. A sidelink channel may include a Physical Sidelink Control Channel (PSCCH) and a Physical Sidelink Shared Channel (PSSCH), The PSCCH may be used to communicate control information, and the PSSCH may be used to communicate data. Embodiments of the methods and apparatuses described herein improve the performance of sidelink V2X communication systems by multiplexing the PSCCH and the PSSCH in time and frequency.

Figure 1:
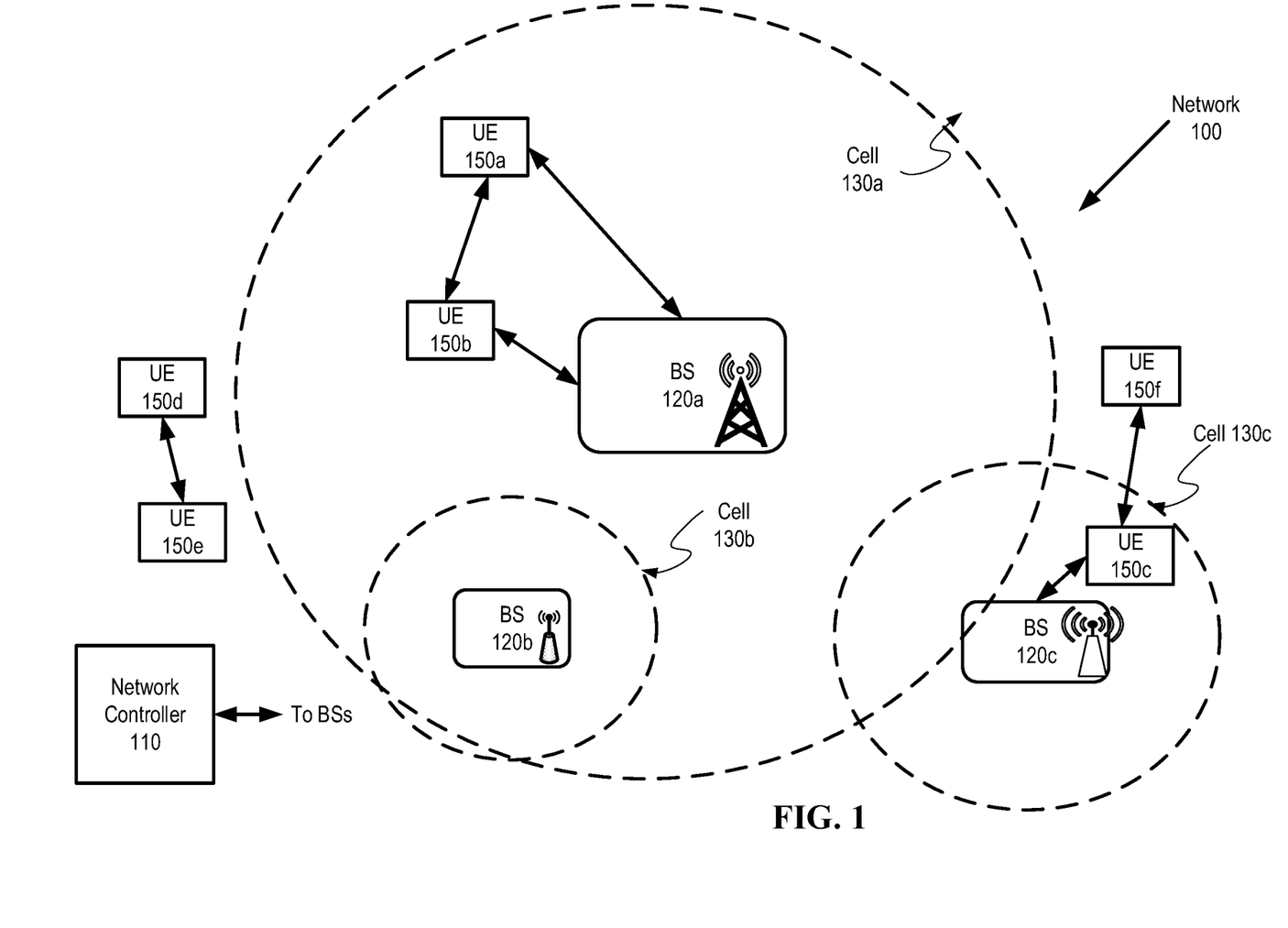
FIG. 1 is a diagram illustrating a network in which the embodiments of the present invention may be practiced.

FIG. 1 is a diagram illustrating a network 100 in which the embodiments of the present invention may be practiced. The network 100 is a wireless network which may be a 5G network, an NR network, and/or the like. The network 100 may include a number of base stations (BSs), such as BSs 120a, 120b, and 120c, collectively referred to as the BSs 120. In some network environments such as an NR network, a BS may be known as a gNodeB, a gNB, and/or the like. In an alternative network environment, a BS may be known by other names. Each BS 120 provides communication coverage for a particular geographic area known as a cell, such as a cell 130a, 130b or 130c. The radius of a cell size may range from several kilometers to a few meters. A BS may communicate with one or more other BSs or network entities directly or indirectly via a wireless or wireline backhaul.

A network controller 110 may be coupled to a set of BSs such as the BSs 120 to coordinate, configure, and control these BSs 120. The network controller 110 may communicate with the BSs 120 via a backhaul.

The network 100 further includes a number of user equipment terminals (UEs), such as UEs 150a-150f, collectively referred to as the UEs 150. The UEs 150 may be anywhere in the network 100, and each UE 150 may be stationary or mobile. The UEs 150 may also be known by other names, such as a mobile station, a subscriber unit, and/or the like. Some of the UEs 150 may be implemented as part of a vehicle. Examples of the UEs 150 may include a cellular phone (e.g., a smartphone), a wireless communication device, a handheld device, a laptop computer, a cordless phone, a tablet, a gaming device, a wearable device, an entertainment device, a sensor, an infotainment device, Internet-of-Things (IoT) devices, or any device that can communicate via a wireless medium.

In some embodiments, two or more UEs 150 (e.g., UEs 150a and 150b; UEs 150d and 150e; UEs 150c and 150f) may communicate directly via sidelink V2X communication, without using any of the BSs 120 as an intermediary to communicate with one another. For example, two communicating UEs may be in the coverage area of one or more BSs (e.g., UEs 150a and 150b are in the coverage area of BS 120a); one of the two communicating UEs may be in the coverage area of a BS 120 (e.g., UE 150c is in the coverage area of BS 120c while UE 150 is not in the coverage area of any BSs); or neither of the two communicating UEs is in the coverage area of any BSs (e.g., both UEs 150d and 150e are outside the coverage area of BSs 120). These UEs 150 can be pre-configured to perform the sidelink V2X communication without the assistance from any BSs, access points, or the like.

To simplify the discussion, the methods and apparatuses are described within the context of NR. However, one of ordinary skill in the art would understand that the methods and apparatuses described herein are applicable generally to a variety of other wireless V2X communication systems.

Furthermore, it is noted that while the disclosed embodiments may be described herein using terminology commonly associated with 5G or NR wireless technologies, the present disclosure can be applied to other multi-access technologies and the telecommunication standards that employ these technologies.

Figure 2:
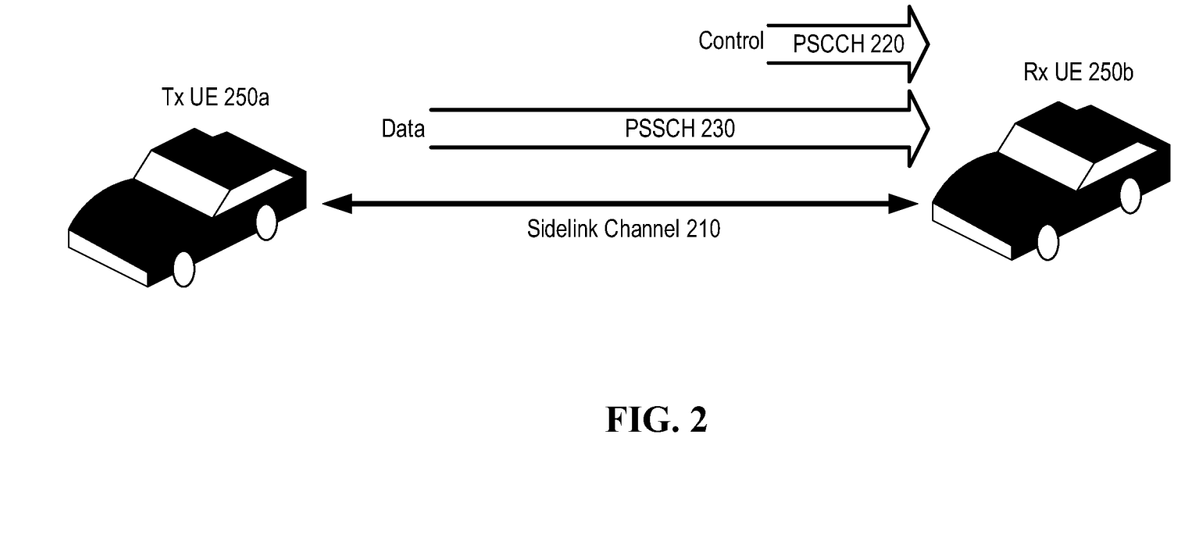
FIG. 2 is a diagram illustrating a concept of sidelink V2X communication between two UEs according to one embodiment.

FIG. 2 is a diagram illustrating a concept of sidelink V2X communication between a transmit (Tx) UE 250a and a receive (Rx) UE 250b according to one embodiment. The Tx UE 250a and the Rx UE 250b may be examples of the UE 150a and the UE 150b, respectively, in FIG. 1. In one embodiment, the Tx UE 250a and the Rx UE 250b may be wireless devices located in corresponding vehicles. In another embodiment, the Rx UE 250b may be a wireless device located in an entity connected to a wireless network, such as the network 100 in FIG. 1.

Before the Tx UE 250a transmits data to the Rx UE 250b, the Tx UE 250a first obtains time resources (i.e., one or more time slots, or "slots") and frequency resources (i.e., one or more resource blocks (RBs) within subchannels) for the sidelink V2X communication. The time resources and the frequency resources may be collectively referred to as the time-and-frequency resources. In some cases, a BS (e.g., one of the BSs 120 in FIG. 1) may select available time-and-frequency resources for the Tx UE 250a. In some cases, the Tx UE 250a may select time-and-frequency resources based on information indicating, at least in part, availability of the resources. Once the Tx UE 250a obtains the necessary time-and-frequency resources, the Tx UE 250a transmits control information in a PSCCH 220 and data in the PSSCH 230 to the Rx UE 250b. As the control information in the PSCCH 220 is used to decode the data in the PSSCH 230, the PSSCH 230 is said to be associated with the PSCCH 220.

In some embodiments, a sidelink channel 210 may be established between the Tx UE 250a and the Rx UE 250b. For example, the PSCCH 220 may carry SideLink Control Information (SCI), which may indicate various transmission parameters for transmitting data to the Rx UE 250b in the PSSCH 230. The transmission parameters may include one or more of a modulation and coding scheme (MCS), the number of RBs in frequency, the number of time slots. Additional information may also be included.

The Rx UE 250b obtains the V2X transmission parameters by decoding the SCI in the PSCCH 220. According to the parameters, the Rx UE 250b can decode the data in the PSSCH 230. In some prior systems that provide Long-Term Evolution (LTE)-based V2X communication, the PSCCH and the PSSCH are multiplexed in frequency only. That is, control information and data are transmitted concurrently in different frequencies. One drawback of these prior systems is that a receiver generally has to buffer the control information for one or more time slots and can decode the data only after the control information is received completely. Due to tight latency constraints in NR V2X, the PSCCH 220 and the PSSCH 230 described herein may be multiplexed both in time and in frequency. Details of the multiplexing are provided below with reference to the examples shown in FIG. 3 and FIGS. 4A-4D.

Figure 3:
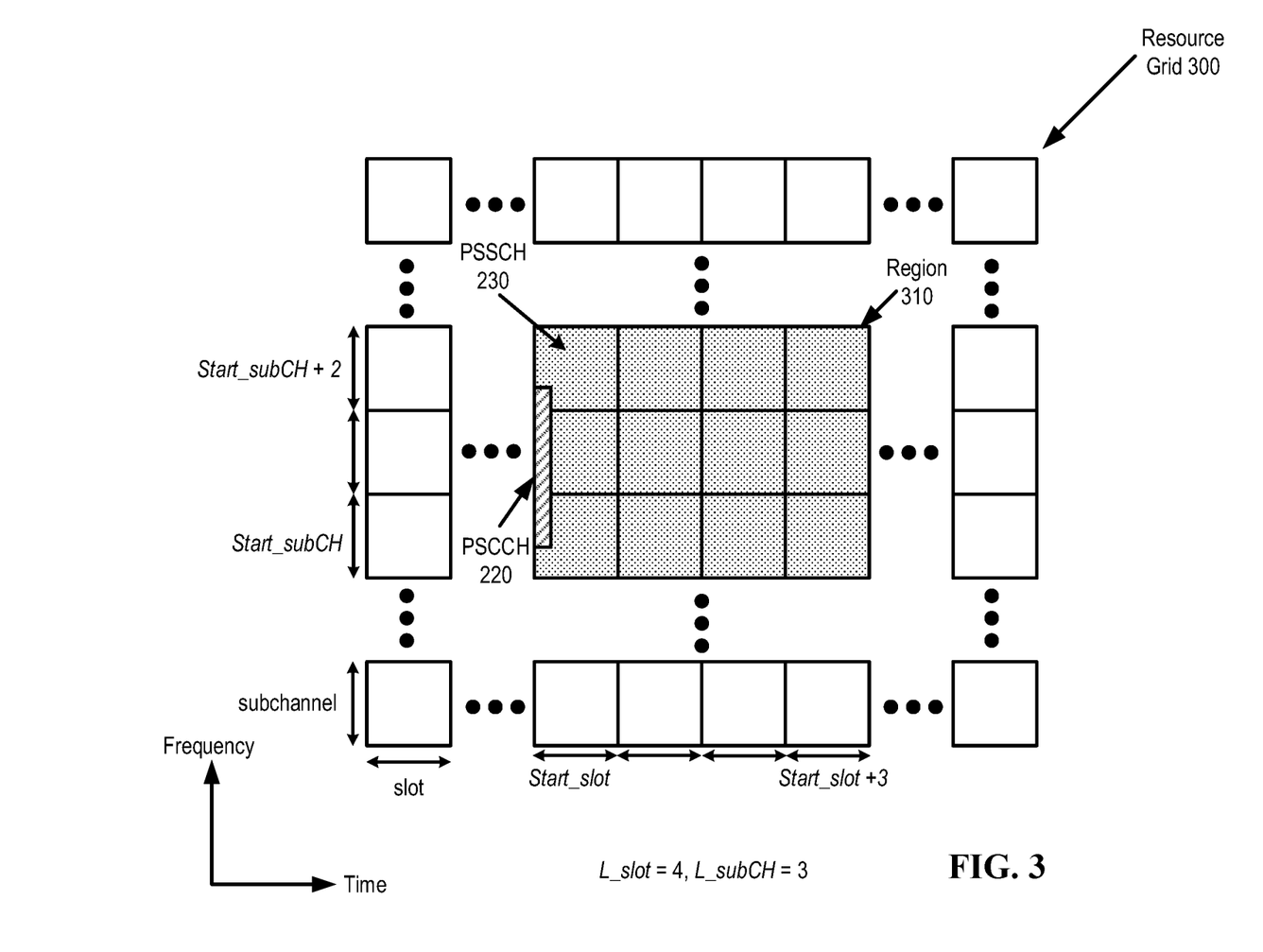
FIG. 3 is a diagram illustrating an example of time-and-frequency resources allocated to a UE for sidelink V2X communication according to one embodiment.

FIG. 3 is a diagram illustrating an example of time-and-frequency resources allocated to a UE (e.g. the Tx UE 250a in FIG. 2) for sidelink V2X communication according to one embodiment, A resource grid 300 represents time-and-frequency resources, with the time axis in the horizontal direction and the frequency axis in the vertical direction. Each square in the resource grid 300 represents a time resource of one slot and a frequency resource of one subchannel.

Multiple time and frequency configurations are supported by NR. With respect to time resources, a frame may be 10 ms in length, and may be divided into ten subframes of 1 ms each. Each subframe may be further divided into multiple equal-length time slots (also referred to as slots), and the number of slots pa subframe may be different in different configurations. Each slot may be further divided into multiple equal-length symbol durations (also referred to as symbols); e.g., 7 or 14 symbols. With respect to frequency resources, NR supports multiple different subcarrier bandwidths. Contiguous subcarriers are grouped into one resource block (RB). In one configuration, one RB contains 12 subcarriers, also referred to as resource elements (REs). Multiple RBs form one subchannel.

Within a time slot, there may be one or more subchannels and one or more slots allocated to sidelink V2X communication. In the example of FIG. 3, the Tx UE 250a may select, or be assigned, four slots and three subchannels for transmitting control information and data to the Rx UE 250b. The slots and subchannels used by the Tx UE 250a may be specified by their respective starting positions and lengths (e.g., Start_slot, L_slot, Start_subCH, and L_subCH, where L stands for "length"). The three-by-four squares in the resource grid 300 is herein referred to as a region 310, which represents the time-and-frequency resources used by the Tx UE 250a for sidelink V2X transmission more specifically, for use as the PSCCH 220 shown in an oblique-lined pattern) and the PSSCH 230 (shown in a dotted pattern).

FIG. 3 shows that, the region 310 is formed by contiguous slots and contiguous subchannels. The PSCCH 220 occupies an initial portion of the first slot (i.e., Start_slot), and covers a partial portion of the first subchannel Start_subCH), the entire second subchannel, and a partial portion of the third subchannel. In one embodiment, the PSSCH 230 occupies the region 310 that is not occupied by the PSCCH 220; that is, the region 310 includes only the PSCCH 220 and the PSSCH 230. In another embodiment, the region 310 may include the PSCCH 220, the PSSCH 230, and reference signals for measuring and calibrating signal strength in the PSCCH 220 and/or the PSSCH 230; e.g., by performing automatic gain control (AGC).

Figure 4A:
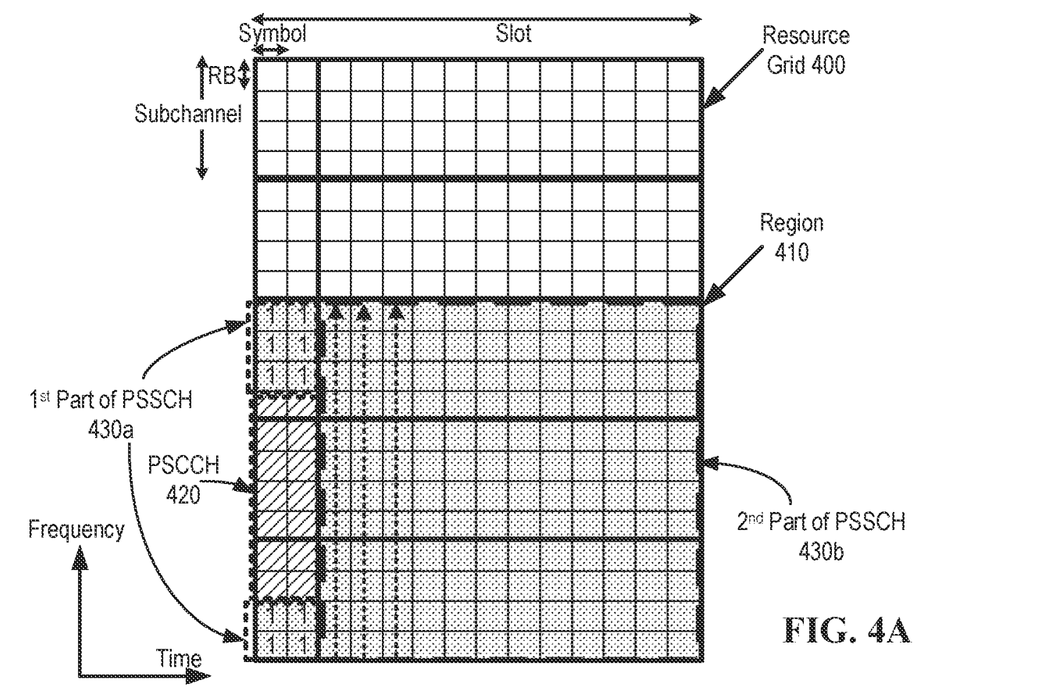
FIG. 4A is a diagram illustrating further details of a resource grid according to one embodiment.

FIG. 4A is a diagram illustrating further details of a resource grid according to one embodiment. FIG. 4A shows a resource grid 400, which may be formed by the beginning slot (i.e., Start_slot) of the resource grid 300 and five subchannels starting from Start_subCH of the resource grid 300. Each slot includes 14 Orthogonal Frequency-Division Multiplexing (OFDM) symbols. Each subchannel is divided into multiple (e.g., 4) concurrent RBs, and each RB spans one symbol duration. An RB may contain multiple (e.g., 12) equal-spaced REs (i.e., subcarriers, which are not shown in FIG. 4A). The resource grid 400 represents time-and-frequency resources for sidelink V2X communication. The basic unit of resource in the resource grid 400 is an RB of one symbol duration, which is also referred to as an RB-symbol unit.

In this embodiment, a number of contiguous and concurrent RBs that occupy the first two symbols in time is designated as a PSCCH 420 (shown in an oblique-lined pattern) for carrying control information including the SCI. The number of symbols used by a PSCCH may be specified by a network system according to the NR specification. The PSCCH 420 may be an example of the PSCCH 220 in FIGS. 2 and 3. The SCI carried in the PSCCH 420 may be decoded by an Rx UE to identify a PSSCH associated with the PSCCH 420; FIG. 4A shows the PSSCH as being composed of a first part of PSSCH 430a and a second part of PSSCH 430b, collectively referred to as the PSSCH 430. In FIG. 4A, each basic unit of resource (i.e., which is an RB-symbol unit shown as one of the smallest squares in the grid 400) in the first part of PSSCH 430a is marked "1" with a dotted background, and each basic unit of resource (i.e., an RB-symbol unit) in the second part of PSSCH 430b is shown with the dotted background without the additional "1" mark.

In FIG. 4A, the PSCCH 420 and its associated PSSCH 430 together form a region 410 in the resource grid 410. The region 410 is formed by contiguous symbols in time and contiguous RBs in frequency; more specifically, the region 410 is formed by the bottom 12 rows of RBs for 14 symbols duration, or equivalently, the bottom three subchannels for one slot duration. The region 410 has the same starting RB for each symbol, and extends in frequency over the same number RBs for each symbol. In the embodiment of FIG. 4A, the region 410 contains only the PSCCH 420 and its associated PSSCH 430. In another embodiment, a region in the resource grid 410 allocated to side ink V2X communication may contain a PSCCH, its associated PSSCH, and reference signals for measuring and calibrating the PSCCH and/or its associated PSSCH.

In one embodiment, the basic units of resource used by the PSSCH 430 follow a frequency-first order; that is, in every symbol duration of the PSSCH 430 (including the first part 430a and the second part 430b), data is filled by the Tx UE and processed by the Rx UE from the lowest frequency to the highest frequency, as indicated h the dotted arrows (only three dotted arrows are shown for simplicity). In one embodiment, the PSCCH 420 may also fallow the frequency-first order; that is, in every symbol duration of the PSSCH 420, control information is filled by the Tx UE and processed by the Rx UE from the lowest frequency to the highest frequency.

In the embodiment of FIG. 4A, the first part of PSSCH 430a uses a first set of time resources (i.e., the leftmost two symbols) overlapping with the symbols used by the PSCCH 420, and also uses a first set of frequency resources (i.e., the $1^{st}$, $2^{nd}$, $10^{th}$, $11^{th}$, and $12^{th}$ RBs from the bottom) non-overlapping with the frequencies of the PSCCH 420. Thus, the PSCCH 420 and the first part of PSSCH 430a may be frequency-multiplexed.

In the embodiment of FIG. 4A, the second part of PSSCH 430b uses a second set of time resources (i.e., the rightmost twelve symbols) non-overlapping with the symbols used by the PSCCH 420. Thus, the PSCCH 420 and the second part of PSSCH 430b may be time-multiplexed. The second part of PSSCH 430b also uses a second set of frequency resources (i.e., the bottom three subchannels) overlapping with the frequencies of the PSCCH 420.

In other words, the PSCCH 420 may be transmitted in a first time period in first frequencies. The first part of PSSCH 430a may be transmitted in the first time period in second frequencies, where the first frequencies and the second frequencies are non-overlapping frequencies. The second part of PSSCH 430b is transmitted in a second time period immediately following the first time period in a contiguous frequency range which includes the first frequencies and the second frequencies.

It is noted that the time-and-frequency resources used by the PSCCH 420 and the PSSCH 430 are formed by one or more contiguous slots of contiguous symbols in time and one or more contiguous RBs of contiguous subcarriers in frequency. Furthermore, the time-and-frequency resources allocated to the PSCCH 420 is formed by contiguous frequency resources (e.g., RBs) and contiguous time resources (e.g., symbols).

The term "overlapping," as used herein with respect to frequency and/or time, refers to "completely overlapping in frequency and/or time." For example, when channel A and channel B use overlapping time resources, it means one of the following scenarios: channel A and channel B span over exactly the same time duration; the entire time duration of channel A is a fraction of the entire time duration of channel B; or the entire time duration of channel B is a fraction of the entire time duration of channel A. Similarly, when channel A and channel B use overlapping frequency resources, it means one of the following scenarios: channel A and channel B span over exactly the same frequency range; the entire frequency range of channel A is a fraction of the entire frequency range of channel B, or the entire frequency range of channel B is a fraction of the entire frequency range of channel A.

The term "non-overlapping," as used herein with respect to frequency and/or time, refers to "no common time duration and/or no common frequency range." However, when channel A and channel B use non-overlapping time/frequency resources, channel A and channel B may share the same boundary in time/frequency. For example, when channel A and channel B use non-overlapping time resources, channel A may immediately follow the last symbol of channel B, or may immediately precede the first symbol of channel B in time. As another example, when channel A and channel B use non-overlapping frequency resources, channel A may immediately follow the last RB of channel B, or may immediately precede the first RB of channel B in frequency.

Figure 4B:
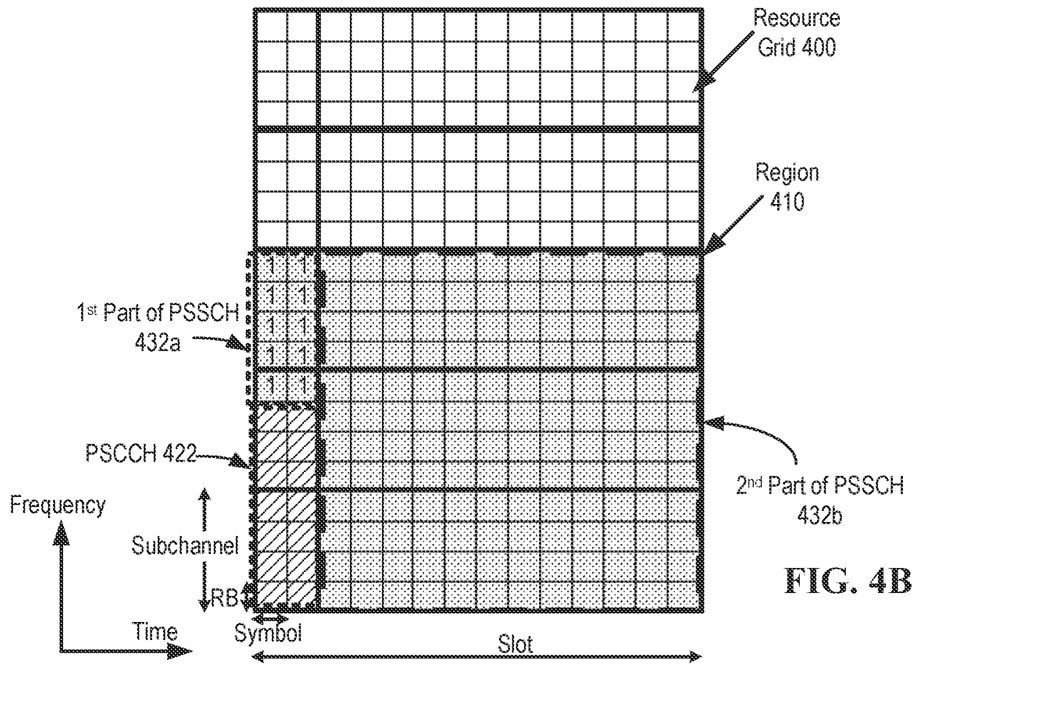
FIG. 4B is a diagram illustrating a resource grid with an alternative frequency resources all for the PSCCH according to one embodiment.

FIG. 4B is a diagram illustrating the resource grid 400 with an alternative frequency resources allocation for a PSCCH 422 according to one embodiment. In FIG. 4B the same region 410 of time-and-frequency resources is allocated to a Tx UE for sidelink V2X transmission as in FIG. 4A. The PSCCH 422 uses the same number of time-and-frequency resources (i.e., the same number of RB-symbol units in the resource grid 400) as the PSCCH 420 in FIG. 4A. However, the PSCCH 422 and the PSCCH 420 (FIG. 4A) has different starting RBs in frequency; more specifically, the PSCCH 422 is the PSCCH 420 shifted down by two RBs in frequency.

FIG. 4B shows that the starting RB of a PSCCH may be the same as the starting RB of its associated PSSCH, while FIG. 4A shows that the starting RB of a PSCCH may be shifted up from the starting RB of its associated PSSCH. In one embodiment, the starting frequency of a PSCCH may be k RBs away from the starting frequency of its associated PSSCH, where k is a non-negative integer configurable by the network system.

The PSSCH associated with the PSCCH 422 is shown in FIG. 4B as a first part of PSSCH 432a and a second part of PSSCH 432b. The second part of the PSSCH 432b uses the same time-and-frequency resources as the second part of PSSCH 430b (FIG. 4A). The first part PSSCH 432a uses RBs that immediately follow the RBs used by its associated PSCCH 422.

Figure 4C:
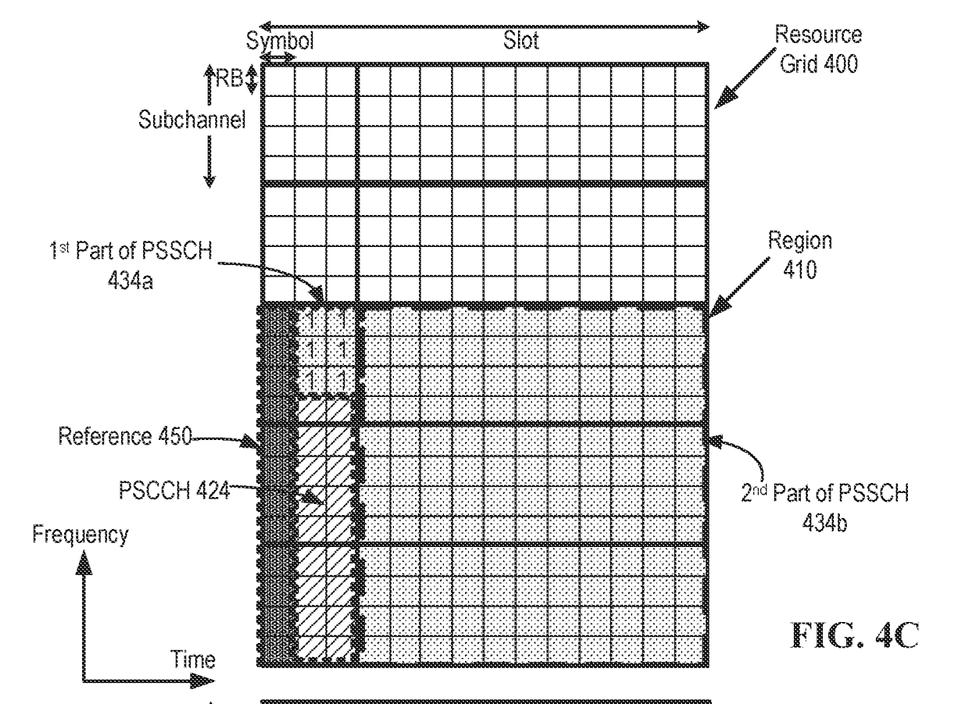
FIG. 4C is a diagram illustrating time-and-frequency resources used by reference signals according to one embodiment.

FIG. 4C is a diagram illustrating time resources used by reference signals according to yet another embodiment. In FIG. 4C, the same region 410 of time-and-frequency resources is allocated to a Tx UE for sidelink V2X transmission as in FIG. 4A and FIG. 4B. However, in addition to a PSCCH 424 and its associated PSSCH (shows as a first part of PSSCH 434a and a second part of PSSCH 434b), the region 410 also includes time-and-frequency resources allocated to reference signals used to measure and/or calibrate the PSCCH 424 and/or its associated PSSCH. In the embodiment of FIG. 4C, the starting symbol of the PSCCH 424 in the slot is the second symbol (as the first symbol is allocated to the reference, signals). In some embodiments, the starting symbol of a PSCCH in the starting slot (i.e., Start_slot) is configurable by the network system; e.g., the starting symbol may be the first symbol or the second symbol in Start_slot).

Figure 4D:
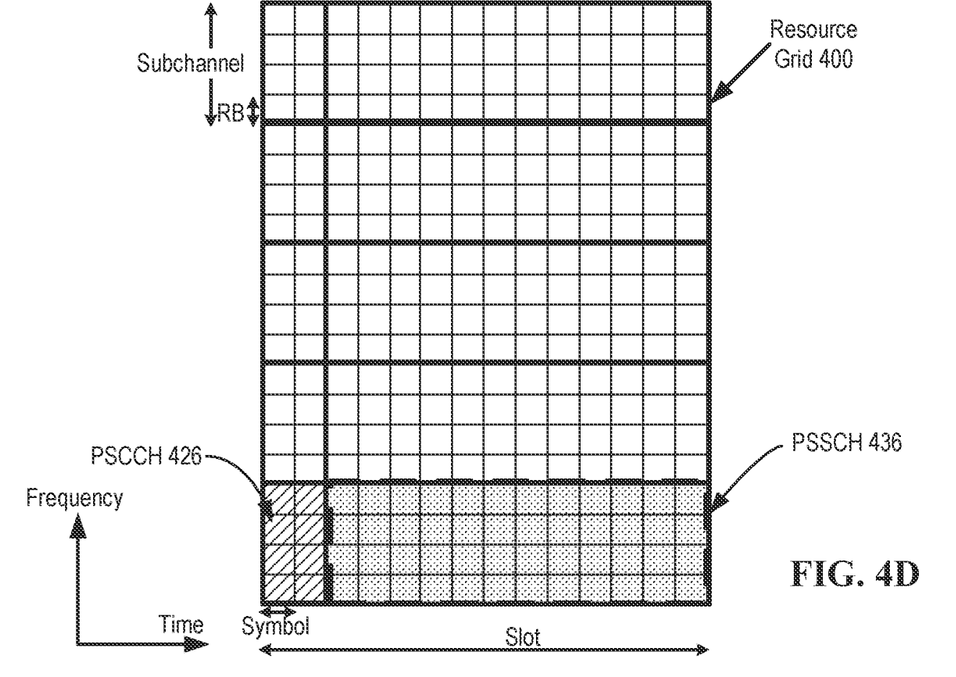
FIG. 4D is a diagram illustrating an alternative allocation of time-and-frequency resources used by sidelink V2X communication according to one embodiment.

FIG. 4D is a diagram illustrating an alternative allocation of time-and-frequency resources used by sidelink V2X communication according to yet another embodiment. In some cases, the sub-region that immediately follows a PSCCH 426 in time and shares the same RBs in frequency as the PSCCH 426 has sufficient time-and-frequency resources for transmitting the encoded data. In these cases, the sub-region is used as a PSSCH 436 which is associated with the PSCCH 426. The PSSCH 436 uses a set of time resources non-overlapping with the PSCCH 426 and a set of frequency resources overlapping with the PSCCH 426. Thus, the PSCCH 426 and the PSSCH 436 may be time-multiplexed. It is noted that even if the data may be encoded to use less than the sub-region of resources assigned to the PSSCH 436, the PSSCH 436 is still assigned the same number of RBs as the PSCCH 426. In some embodiments, redundancy or extra data encoding may be applied to the data so that the encoded data can occupy the entire PSSCH 436, which uses the entire frequency range of the PSCCH 426 and the set of time resources non-overlapping with the PSCCH 426.

It is noted that the multiplexing of the PSCCH and the PSSCH is not limited to the aforementioned examples. For example, the number of RBs in a subchannel may be different in alternative embodiments, and the number of symbols and the number of RBs occupied by the PSCCH may be different in alternative embodiments. The size of the region allocated to the PSCCH and the PSSCH may also be different in alternative embodiments.

The multiplexing of the PSCCH and the PSSCH described herein may include both time-division multiplexing (TDM) and frequency-division multiplexing (FDM). Unlike a conventional FDM-only design in which an Rx UE cannot start to decode the PSSCH until the end of a slot, the multiplexing methods described herein enables the Rx UE to start decoding the PSSCH as soon as a small number of symbols (e.g., 2 or 3) containing the SCI in the PSCCH is decoded. Furthermore, according to the multiplexing methods described herein, Rx UEs can power down for the rest of a transmission time interval (TTI) if the UEs learn from decoding the PSCCHs that they are not scheduled for that TTI.

The multiplexing methods described herein improve resource efficiency. Within the time-and-frequency resources used by the sidelink V2X transmission, a Tx UE uses all frequency resources in every symbol within a TTI (e.g., a slot). Thus, resource efficiency is achieved since all frequency resources within the available time duration are utilized.

The multiplexing methods described herein include frequency-multiplexing of the PSCCH and the PSSCH, thereby enabling the PSSCH to start at the same time as the PSCCH and in non overlapping frequencies. The multiplexing methods described herein further include time-multiplexing of the PSCCH and the PSSCH, thereby enabling the PSSCH to continue after the PSCCH ends in time, using overlapping frequencies with the PSCCH.

A PSCCH and its associated PSSCH for sidelink V2X communication have one or more of the following characteristics. In one embodiment, the number of symbols used by the PSCCH is configurable; e.g., one, two, or three symbols. The number of RBs used by the PSCCH is also configurable and can be independent of the number of RBs in a subchannel. The PSCCH may extend in time over one or more symbols (e.g., 2 or 3 symbols), and may extend in frequency over any number of RBs, where this number of RBs may be less, or more, than the number of RBs in a sub-channel. The PSCCH is composed of contiguous symbols and contiguous RBs. The starting symbol of the PSCCH in a slot is configurable and can be the first or the second symbol of the starting slot (i.e., Start_slot). The starting RB position of the PSCCH is k RBs away from the starting RB position of the PSSCH, where k≥0. The starting and ending positions of the PSCCH may or may not be aligned with the subchannel boundaries.

The time-and-frequency resources used by the PSCCH and its associated PSSCH have one or more of the following characteristics. The time-and-frequency resources used by the PSCCH and the PSSCH are formed by one or more contiguous slots of contiguous symbols in time and one or more contiguous RBs of contiguous subcarriers in frequency. The time-and-frequency resources allocated to the PSCCH is formed by contiguous frequency resources and contiguous time resources. Within the time-and-frequency resources, the set of REs in each symbol are identical. In one embodiment, a portion of the time-and-frequency resources is allocated to the PSCCH and the rest of time-frequency resources is allocated to its associated PSSCH. In one embodiment, within the time-frequency resources, every RE is used by the PSCCH, the associated PSSCH, or reference signals for the PSCCH and the PSSCH. The frequency resources used by the PSSCH are at least as large as the frequency resources used by the PSCCH.

In one embodiment, the time-and-frequency resources used by the PSCCH and/or PSSCH follow the frequency-first order, an example of which is shown and described in connection with FIG. 4A. The frequency-first order is applicable to the examples in FIGS. 4B, 4C and 4D, as well as other scenarios of time-and-frequency usage with both TDM and FDM of the PSCCH and the PSSCH.

Figure 5A:
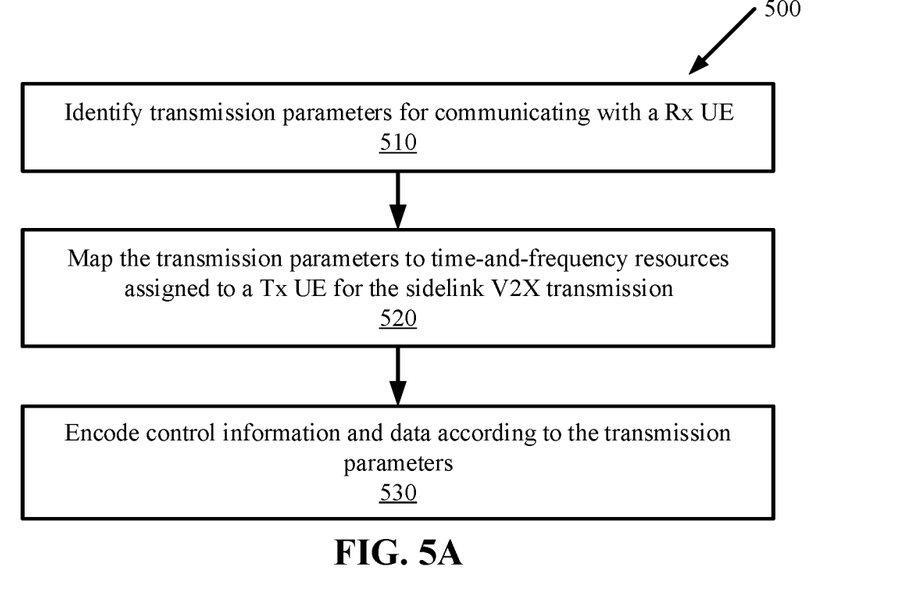
FIGS. 5A and 5B illustrate methods for a transmit (Tx) UE to perform sidelink V2X transmission according to one embodiment.
Figure 5B:
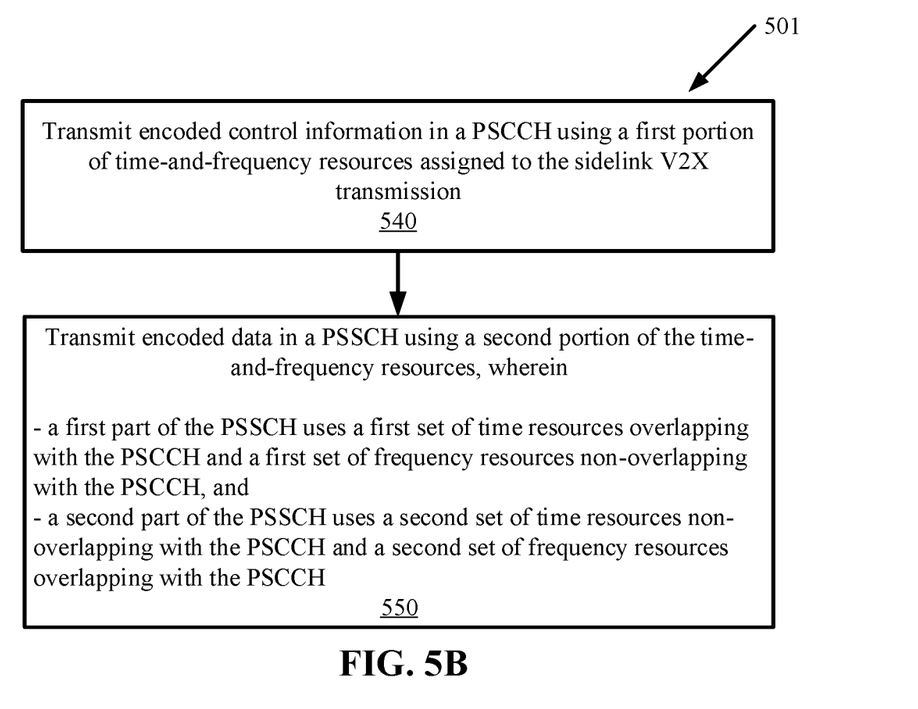

FIGS. 5A and 5B illustrate methods 500 and 501 for a Tx UE to perform sidelink V2X transmission according to one embodiment. The method 500 may be performed by the UE 150a and/or UE 150b of FIG. 1 and/or the UE 700 of FIG. 7 in some embodiments. The method 500 starts at step 510 when the UE identifies transmission parameters for communicating with an Rx UE. The UE at step 520 maps the transmission parameters to time-and-frequency resources assigned to the UE for the V2X transmission. The UE at step 530 encodes control information and data according to the transmission parameters.

After step 530, the process of sidelink V2X transmission proceeds to step 540 of method 501 in FIG. 5B. The UE (i.e. the Tx UE) at step 540 transmits the encoded control information in a PSCCH using a first portion of the time-and-frequency resources assigned to the V2X transmission. The UE at step 550 transmits encoded data in a PSSCH using a second portion of the time-and-frequency resources. In some embodiments, step 540 and step 550 may be performed in any order in time, such as sequentially, in parallel or partially in parallel.

With respect to the PSCCH and the PSSCH, a first part of the PSSCH uses a first set of time resources overlapping with the PSCCH and a first set of frequency resources non-overlapping with the PSCCH. A second part of the PSSCH uses a second set of time resources non-overlapping with the PSCCH and a second set of frequency resources overlapping with the PSCCH.

In one embodiment, the time-and-frequency resources are described by a region of a resource grid, wherein the region is formed by contiguous RBs in frequency and contiguous time slots. In one embodiment, the transmission parameters include one or more of: a modulation and coding scheme (MCS), the number of resource blocks (RBs), and the number of time slots for the V2X transmission.

Figure 6:
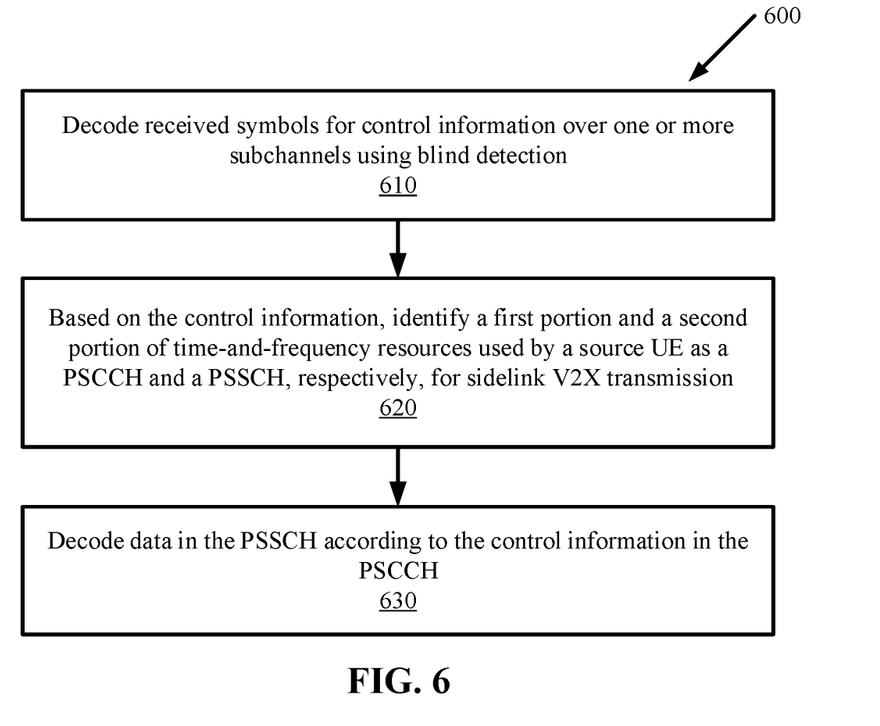
FIG. 6 illustrates a method for a receive (Rx) UE to receive sidelink V2X transmission from a Tx UE according to one embodiment.

FIG. 6 illustrates a method 600 for a receive (Rx) UE to receive sidelink V2X transmission from a Tx UE according to one embodiment. The method 600 may be performed by the UE 150a and/or UE 150b of FIG. 1 and/or the UE 700 of FIG. 7 in some embodiments. The method 600 starts at step 610 when the Rx UE decodes received symbols for control information over one or more subchannels using blind detection. Based on the control information, the Rx UE at step 620 identifies a first portion and a second portion of time-and-frequency resources used by the Tx UE as a PSCCH and a PSSCH, respectively, for the sidelink V2X transmission. The destination UE at step 630 decodes data in the PSSCH according to the control information in the PSCCH.

In one embodiment, the time-and-frequency resources, the PSCCH, and the PSSCH mentioned in the method 600 may be the same as those mentioned in the method 501 of FIG. 5B. In one embodiment, the Rx UE may perform the method 501 except that "transmit" is replaced by "receive."

For example, an Rx UE may check a set of sub-channels in a predetermined frequency range at the beginning of a slot. The set of sub-channels may be contiguous in frequency. The Rx UE may perform blind detection to concurrently decode the symbols in each sub-channel to determine whether there is data in transmission for which it is the intended recipient. The Rx UE also buffers the received symbols in the set of sub-channels before the Rx UE successfully makes the determination. When the Rx UE decodes SCI in a PSCCH for which it is the intended recipient, the Rx UE from the decoded SCI identifies the starting symbol and the starting RB of the associated PSSCH, as well as the number of symbols (or slots) and the number of RBs (or sub-channels) in the associated PSSCH. Some of the data in the PSSCH may be buffered by the Rx UE before the SCI was successfully decoded. The Rx UE can start decoding the data in the PSSCH as soon as the SCI is decoded.

Figure 7:
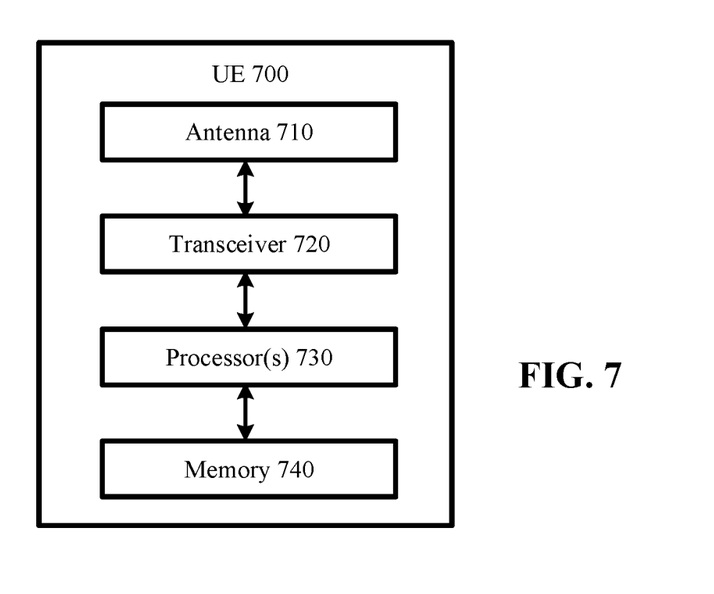
FIG. 7 is a block diagram illustrating elements of a UE configured to provide sidelink V2X communication according to one embodiment.

FIG. 7 is a block diagram illustrating elements of a UE 700 (also referred to as a wireless device, a wireless communication device, a wireless terminal, etc.) configured to provide sidelink V2X communication according to one embodiment. As shown, the UE 700 may include an antenna 710, and a transceiver circuit (also referred to as a transceiver 720) including a transmitter and a receiver configured to provide uplink and downlink radio communications with a base station of a radio access network, and to provide sidelink V2X communications directly with other wireless devices. The UE 700 may also include a processor circuit (which is shown as a processor 730 and which may include one or more processors) coupled to the transceiver 720. The processor(s) 730 may include one or more processor cores. The UE 700 may also include a memory circuit (also referred to as memory 740) coupled to the processor 730. The memory 740 may include computer-readable program code that when executed by the processor 730 causes the processor 730 to perform operations according to embodiments disclosed herein. The UE 700 may also include an interface (such as a user interface). The UE 700 may be incorporated in a vehicle or other wireless devices operable to perform sidelink V2X communication. It is understood the embodiment of FIG. 7 is simplified for illustration purposes. Additional hardware components may be included.

Although the UE 700 is used in this disclosure as an example, it is understood that the methodology described herein is applicable to any computing and/or communication device capable of sidelink V2X communication.

The operations of the flow diagrams of FIGS. 5A, 5B and 6 have been described with reference to the exemplary embodiments of FIGS. 1 and 7. However, it should be understood that the operations of the flow diagrams of FIGS. 5A, 5B and 6 can be performed by embodiments of the invention other than the embodiments of FIGS. 1 and 7, and the embodiments of FIGS. 1 and 7 can perform operations different than those discussed with reference to the flow diagrams. While the flow diagrams of FIGS. 5A, 5B and 6 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for sidelink vehicle-to-everything (V2X) transmission, comprising:
    obtaining, by a first user equipment (UE), time-and-frequency resources for the sidelink V2X communication, wherein the time-and-frequency resources are bounded by two subchannel boundaries and two slot boundaries;
    transmitting, from the first UE to a second UE, encoded control information in a Physical Sidelink Control Channel (PSCCH) that occupies a first portion of the time-and-frequency resources starting from a lowest resource block (RB) in a lowest subchannel and from an earliest symbol available for sidelink control and data transmission, the PSCCH formed by contiguous RBs that are in same symbols, wherein the number of RBs in the PSCCH is less than the number of RBs in a subchannel and the number of symbols in the PSCCH is less than the number of symbols in a slot; and
    transmitting, from the first UE to the second UE, encoded data in a Physical Sidelink Shared Channel (PSSCH) that occupies a second portion of the time-frequency resources including (a) a first set of RBs in same symbols as the PSCCH, wherein the first set of RBs are and not used by the PSCCH, and (b) a second set of RBs in symbols not used by the PSCCH, wherein the second set of RBs include the first set of RBs and the contiguous RBs used by the PSCCH.

2. The method of claim 1, wherein the PSSCH includes a first part that is transmitted with the PSCCH by frequency-division multiplexing (FDM) and a second part that is transmitted with the PSCCH by time-division multiplexing (TDM).

3. The method of claim 1, wherein the PSSCH uses the first set of RBs and the second set of RBs in contiguous symbols.

4. The method of claim 1, wherein the first set of RBs are formed by first frequency resources that are a subset of second frequency resources that form the second set of RBs.

5. The method of claim 1, wherein both the first set of RBs and the second set of RBs are formed by contiguous frequency resources.

6. The method of claim 1, wherein the PSCCH occupies contiguous frequency resources and contiguous time resources.

7. The method of claim 1, wherein the time-and-frequency resources include the first portion allocated to the PSCCH, the second portion allocated to the PSSCH, and a remaining portion wherein the remaining portion is allocated to reference signals associated with the PSCCH and the PSSCH.

8. The method of claim 1, wherein the PSCCH occupies a configurable number of symbols and a configurable number of RBs.

9. The method of claim 1, wherein a starting symbol position of the PSCCH is a configurable number of symbols away from a slot boundary.

10. The method of claim 1, wherein the time-and-frequency resources used by the PSSCH follow a frequency-first order in which data in the PSSCH is processed from a lowest frequency to a highest frequency for every symbol.

11. A transmit (Tx) user equipment (UE) operative to perform sidelink vehicle-to-everything (V2X) transmission, comprising:
- an antenna;
- a transceiver coupled to the antenna;
- one or more processors coupled to the transceiver; and
- memory coupled to the one or more processors, wherein the Tx UE is operative to:
- obtain time-and-frequency resources for the sidelink V2X communication, wherein the time-and-frequency resources are bounded by two subchannel boundaries and two slot boundaries;
- transmit to a receive (Rx) UE encoded control information in a Physical Sidelink Control Channel (PSCCH) that occupies a first portion of the time-and-frequency resources starting from a lowest resource block (RB) in a lowest subchannel and from an earliest symbol available for sidelink control and data transmission, the PSCCH formed by contiguous RBs that are in same symbols, wherein the number of RBs in the PSCCH is less than the number of RBs in a subchannel and the number of symbols in the PSCCH is less than the number of symbols in a slot; and
- transmit to the Rx UE encoded data in a Physical Sidelink Shared Channel (PSSCH) that occupies a second portion of the time-frequency resources including (a) a first set of RBs in same symbols as the PSCCH, wherein the first set of RBs are not used by the PSCCH, and (b) a second set of RBs in symbols not used by the PSCCH, wherein the second set of RBs include the first set of RBs and the contiguous RBs used by the PSCCH.

12. The Tx UE of claim 11, wherein the PSSCH uses the first set of RBs and the second set of RBs in contiguous symbols.

13. The Tx UE of claim 11, wherein the first set of RBs are formed by first frequency resources that are a subset of second frequency resources that form the second set of RBs.

14. The Tx UE of claim 11, wherein both the first set of RBs and the second set of RBs are formed by contiguous frequency resources.

15. The Tx UE of claim 11, wherein the PSCCH occupies contiguous frequency resources and contiguous time resources.

16. A receive (Rx) user equipment (UE) operative to receive sidelink vehicle-to-everything (V2X) transmission, comprising:
- an antenna;
- a transceiver coupled to the antenna;
- one or more processors coupled to the transceiver; and
- memory coupled to the one or more processors, wherein the Rx UE is operative to:
- receive from a transmit (Tx) UE encoded control information in a Physical Sidelink Control Channel (PSCCH) that occupies a first portion of time-and-frequency resources starting from a lowest resource block (RB) in a lowest subchannel and from an earliest symbol available for sidelink control and data transmission, the PSCCH formed by contiguous RBs that are in same symbols, wherein the number of RBs in the PSCCH is less than the number of RBs in a subchannel and the number of symbols in the PSCCH is less than the number of symbols in a slot, and wherein the time-and-frequency resources are bounded by two subchannel boundaries and two slot boundaries; and
- receive from the Tx UE encoded data in a Physical Sidelink Shared Channel (PSSCH) that occupies a second portion of the time-frequency resources including (a) a first set of RBs in same symbols as the PSCCH, wherein the first set of RBs are not used by the PSCCH, and (b) a second set of RBs in symbols not used by the PSCCH, wherein the second set of RBs include the first set of RBs and the contiguous RBs used by the PSCCH.

17. The Rx UE of claim 16, wherein the PSSCH uses the first set of RBs and the second set of RBs in contiguous symbols.

18. The Rx UE of claim 16, wherein the first set of RBs are formed by first frequency resources that are a subset of second frequency resources that form the second set of RBs.

19. The Rx UE of claim 16, wherein both the first set of RBs and the second set of RBs are formed by contiguous frequency resources.

20. The Rx UE of claim 16, wherein the PSCCH occupies contiguous frequency resources and contiguous time resources.

* * * * *